United States Patent [19]

Thompson et al.

[11] Patent Number: 4,716,957
[45] Date of Patent: Jan. 5, 1988

[54] DUCT TYPE MULTIZONE AIR CONDITIONING SYSTEM

[75] Inventors: Peter Thompson; Nobuo Otsuka; Kisuke Yamazaki; Hideo Igarashi, all of Kamakura, Japan

[73] Assignee: Mitsubishi Denki Kabushiki Kaisha, Japan

[21] Appl. No.: 844,182

[22] Filed: Mar. 26, 1986

[30] Foreign Application Priority Data

| Mar. 29, 1985 | [JP] | Japan | 60-65378 |
| Mar. 29, 1985 | [JP] | Japan | 60-65379 |
| May 9, 1985 | [JP] | Japan | 60-96702 |
| May 27, 1985 | [JP] | Japan | 60-112132 |

[51] Int. Cl.⁴ .................. G05D 23/00; F24F 3/044; F25B 29/00
[52] U.S. Cl. ...................... 165/12; 165/22; 165/29; 165/11.1; 236/46 R; 236/49; 236/94; 236/1 B
[58] Field of Search .......... 165/12, 22, 29, 11.1; 236/1 B, 46 R, 49, 94

[56] References Cited

U.S. PATENT DOCUMENTS

| 4,217,646 | 8/1980 | Caltagirone et al. | 165/22 |
| 4,244,517 | 1/1981 | Stanke et al. | 236/49 |
| 4,264,034 | 4/1981 | Hyltin et al. | 236/46 R |
| 4,298,163 | 11/1981 | Richardson et al. | 236/46 R |
| 4,319,711 | 3/1982 | Barker et al. | 236/46 R |
| 4,406,397 | 9/1983 | Kamata et al. | 236/49 |
| 4,460,125 | 7/1984 | Barker et al. | 236/94 |
| 4,479,604 | 10/1984 | Didner | 236/49 |
| 4,530,395 | 7/1985 | Parker et al. | 236/49 |
| 4,549,601 | 10/1985 | Wellman et al. | 236/1 B |
| 4,606,401 | 8/1986 | Levine et al. | 236/94 |
| 4,661,914 | 4/1987 | Mulokey et al. | 236/46 R |

FOREIGN PATENT DOCUMENTS

| 5623473 | 6/1976 | Australia . | |
| 5172779 | 5/1981 | Australia . | |
| 4547879 | 11/1982 | Australia . | |
| 0007497 | 2/1980 | European Pat. Off. | 165/29 |
| 0019344 | 11/1980 | European Pat. Off. | 236/46 R |
| 0063713 | 5/1980 | Japan | 236/94 |
| 608581 | 3/1985 | Japan . | |

OTHER PUBLICATIONS

"The News, Air Conditioning, Heating and Refrigeration", Bryant, Nov. 1983.

Primary Examiner—William R. Cline
Assistant Examiner—John K. Ford
Attorney, Agent, or Firm—Leydig, Voit & Mayer

[57] ABSTRACT

An air duct type multizone air conditioning system having air dampers and corresponding thermostats in respective zones under the control of a main controller. The main controller can override desired temperatures selected by the corresponding thermostats in any of the zones and automatically detects the number of the number of zones, the presence of an auxiliary heater, and a heat pump, and the presence of an air damper and corresponding thermostat properly located in the same zone. The main controller also receives information regarding the operating cost of the heat pump and the auxiliary heater to ensure their cost-effective use.

6 Claims, 18 Drawing Figures

DUCT TYPE MULTIZONE AIR CONDITIONING SYSTEM

BACKGROUND OF THE INVENTION

This invention relates to a duct type multizone air conditioning system for cooling and heating a plurality of air conditioning zones through ducts.

An air conditioning system for a residence has prevailed. Such an air conditioning system generally consists of cooling and heating air-to-air heat pump, an extremely cold time heating gas burner and a blower fan. One of the heat exchangers of the heat pump is installed out of door, and the other is disposed to be connected with the gas burner. This system has three operation modes as follows:

(1) A cooling operation mode which does not operate the gas burner but operates to cool the heat pump at a hot weather time, (2) An ordinary heating operation mode which does not operate the gas burner at a cold weather time but operates to heat the heat pump, and (3) An extremely cold weather heating operation mode which interrupts the heat pump at extremely cold time in which the efficiency of the heat pump is very low and operates to heat only with the gas burner as a heat source.

A space to be air conditioned in a residence at present is ordinarily divided into several rooms. Thus, a cooling and heating duct type air conditioning system in which a plurality of rooms of a space to be air conditioned (hereinbelow referred to as "zones") are cooled or heated through ducts by a central unit has widely been adopted.

However, only a thermostat for detecting room temperature is provided in the conventional duct type air conditioning system. Thus, there arise drawbacks that the respective zones to be air conditioned cannot be controlled individually at the temperatures, the zones cannot be maintained separately comfortably, and unnecessary energy is consumed to decrease the efficiency.

SUMMARY OF THE INVENTION

A duct type multizone air conditioning system, which has a cooling and heating heat pump, a heating gas burner, a supply air duct for supplying air to a plurality of zones to be air conditioned, and a blower fan for forceably circulating conditioned air through the duct to the plurality of zones to be air conditioned, according to the present invention comprises a plurality of temperature detecting means, a plurality of temperature detectors, a plurality of air dampers, and a plurality of zone temperature setting devices. The plurality of temperature detectors are respectively disposed in corresponding ones of the zones to be air conditioned, each temperature detector detecting a present temperature of the corresponding one of the zones. The plurality of air dampers are respectively disposed in corresponding ones of the zones for controlling the supply of air to the corresponding zone to be air conditioned. The plurality of zone temperature setting devices are respectively disposed in corresponding ones of the zones, each temperature setting device setting a present set temperature for the corresponding one of the zones. According to the present invention, the duct type multizone air conditioning system further comprises means for controlling the opening and closing of the air dampers so that the present temperatures detected by each of the temperature detectors become the present set temperatures set by the zone temperature setting device, means for automatically determining the number of the zones to be air conditioned, means for automatically determining the presence of an air damper and corresponding temperature detector in each zone, means for automatically determining the presence of a heating gas burner and the presence of a heat pump within the air conditioning system, means for automatically determining the presence of a damper and corresponding temperature setting device in the same zone, and means for receiving heat pump cost and heating gas burner cost information so as to ensure cost-effective use of the heat pump and heating gas burner.

Another embodiment of the present invention comprises main temperature setting means for simultaneously setting the temperature of a plurality of rooms in the air damper opening and closing means to control to open or close the air damper, zone temperature setting means for setting the temperatures of a plurality of rooms of zones to be air conditioned, and temperature deciding means for always inputting a signal corresponding to a preset set temperature from the main temperature setting means, storing the present set temperature as the previously set temperature, comparing the previously set temperature with a present set temperature to be input next, and altering the control temperature to the present set temperature to be input next. Thus, even if any of the present set temperature of the main temperature setting means or the zone temperature setting means is altered, a preferential sequence is always given to the last operated temperature. Therefore, this system has such an advantage that a user can set the control temperature to the temperature desired at present at any time.

In this embodiment, the fact that the control temperature is set to the temperature desired by the user can be readily confirmed by the user by indicating the control temperature and the present temperature in the zone temperature setting means and by indicating the present set temperature in the main temperature setting means, and even if the control temperatures in the respective rooms are varied by the main temperature setting means, the user can immediately confirm it.

In further another embodiment, the air damper opening and closing means comprises a timer function and a reset mode capable of manually setting a temperature having means for indicating a predetermined time at a speed faster than the real time and inputting the set temperature in the predetermined time, and means for storing the input and display means for indicating the predetermined time and the set temperature for controlling a schedule. According to this embodiment, the predetermined time can be displayed at a speed faster than the real time in the reset mode and the set temperature input from the set temperature input means can be simultaneously indicated, the predetermined time can be set while visually confirming the set temperature.

Further, in this embodiment, a check mode for displaying the predetermined time and the set temperature at a speed faster than the real time is provided, thereby displaying the predetermined time at a speed faster than the real time and simultaneously displaying the set temperature in the predetermined time in the check mode. Thus, the set temperature in the predetermined time can be visually confirmed in a short time.

Further, in a separate embodiment, the air damper opening and closing means comprises an analyzer having means for storing a program for obtaining an initializing information detachable to the opening and closing means and necessary for air conditioning control, and the initializing information necessary for air conditioning controller can be suitably input by the initializing program contained in the analyzer.

DESCRIPTION OF THE PREFERRED EMBODIMENTS

Figure 1:
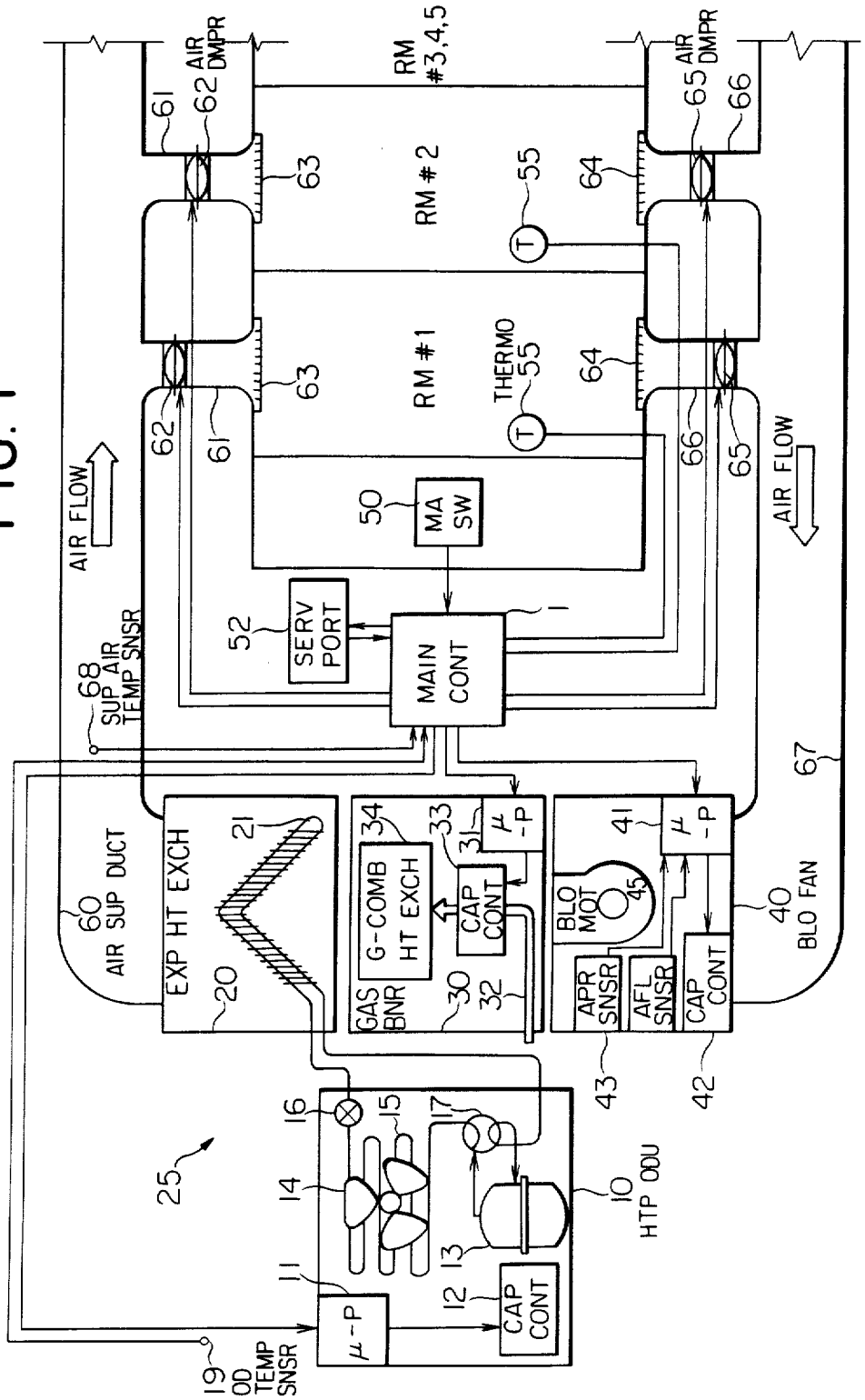
FIG. 1 is a view illustrating the construction of one embodiment of a duct type multizone air conditioning system according to the present invention.

An embodiment of the present invention will be described in detail with reference to the accompanying drawings. In FIG. 1, (1) designates a main controller made of a microprocessor for controlling the entire duct type multizone air conditioning system of this embodiment, (25) designates a cooling and heating heat pump, (10) is an outdoor unit of the heat pump, (19) designates an outdoor temperature sensor for detecting the outdoor temperature, (20) designates an expansion heat exchanger as an indoor unit of the heat pump, (30) designates a capacity variable type gas burner, (40) designates a capacity variable type blower fan, (50) designates a master switch for inputting various types of commands by a user to the air conditioning system, (52) designates a service port connected with the main controller (1), (55) designates room thermostat respectively provided in a plurality of zones to be air conditioned (e.g., rooms #1 to #5), (60) designates an air supply duct for leading air supplied from a central unit having the heat exchanger 20, the gas burner 30 and the blower fan 40 to the zones to be air conditioned, (61) designates a branch duct for branching the air from the duct (60) to the respective zones to be air conditioned, (62) designates an air supply side air damper to be disposed arbitrarily at opening or closing position, (63) designates an air supply port opened with the zones to be air conditioned, (64) designates an air exhaust port opened with the zones to be air conditioned, (65) designates an air exhaust side air damper to be disposed arbitrarily at opening or closing position, (66) designates a branch duct for exhausting air stream from the zones to be air conditioned, (67) designates an air exhaust duct for circulating the air to the central unit, and (68) designates a supply air temperature sensor provided in the duct (60).

The outdoor unit (10) of the heat pump has a microprocessor (11) exclusive to control the unit, a capacity controller (12) made of an inverter, a compressor (13) for compressing refrigerant, a blowing fan (14), a pipe (15) for forming a refrigerant circuit, an expansion value (16) for regulating the flow rate of the refrigerant, and a switching valve (17) for switching the flow of the refrigerant in response to the cooling or heating.

The heat exchanger (20) has a pipe (21) with fins for absorbing or exhausting heat, and is connected with the unit (10).

The gas burner (30) has a microprocessor 31 exclusive for controlling the burner, a gas inlet (32), a capacity controller (33) and a gas combustion heat exchanger (34).

The blower fan (40) has a microprocessor (41) exclusive for controlling the fan, a capacity controller (42) made of an inverter, a pneumatic pressure sensor (43) for monitoring the increase in the pressure form the inlet side to the inlet side of the fan (40), and a blower motor (45) for rotatably driving the fan (40). The fan (40) forms a windage variable duct system together with the ducts (60) and (67) and the air dampers (62) and (65).

The master switch (50) decides the operation modes of the air conditioning system and has the following three functions. The first function is for a user to select any of heating operation mode, cooling operation mode and system stop mode. The second function is for a user to select a common temperature control mode for controlling all zones at the same temperature and an individual temperature control mode for individually controlling the temperature of the zones to be air conditioned. Further, the third function is for a user to set a desired common temperature when the common temperature control mode is selected. Since the room thermostats (55) of the zones to be air conditioned respectively detect the temperature of the zones to be air conditioned in both the individual temperature control mode and the common temperature control mode, the master switch (50) itself does not contain a temperature sensor.

Output signals from the outdoor temperature sensor (19), the pneumatic pressure sensor (43), the room thermostat (55) and the temperature sensor (68) are transmitted to the main controller (1), which performs calculations using these quantities in accordance with a predetermined program. Various control signals are output from the main controller (1) on the basis of the calculated result, and the control signals are supplied to the air dampers (62), (65), the blower fan (40), the outdoor unit (10) of the heat pump and the gas burner (30) as required.

The microprocessors (11), (31) and (41) not only regulate the capacities of the unit (10), the gas burner (30) and the fan (40), but start, stop and operate these units for safety.

Then, the operation of the duct type multizone type air conditioning system of the embodiment constructed as described above will be described. The operation of the heating operation mode will be first discribed.

Figure 2:
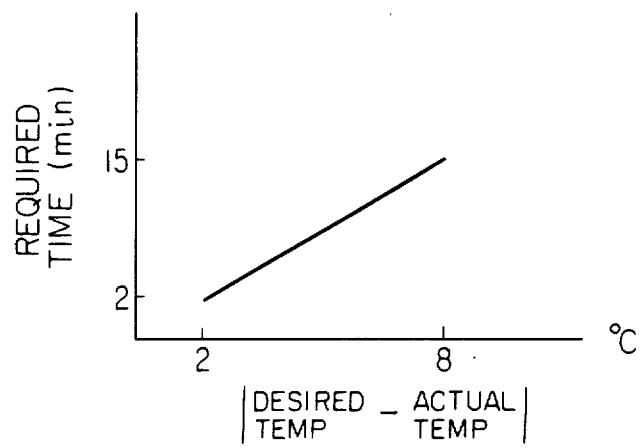
FIG. 2 is a diagram illustrating the relationship between the temperature difference in the air conditioning system in FIG. 1 and the temperature recovery necessary time.
Figure 3:
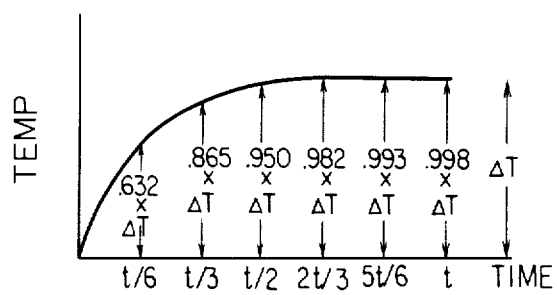
FIG. 3 is a diagram illustrating the relationship between the time and the temperature under a predetermined heat gain in the air conditioning system in FIG. 1.

In the heating operation mode, the main controller (1) reads out the temperatures of the zones to be air conditioned from the room thermostats (55) and compares them with the desired set temperatures of the zones. The desired set temperatures are set at the master switch (50) or the room thermostats (55). When the temperature of the heating time of a certain zone to be air conditioned is lower than the desired set temperature, the main controller (1) calculates to decide the necessary time to raise the zone to be air conditioned to the desired set temperature. FIG. 2 illustrates the relationship between the difference between the desired temperature and the actual temperature and the length of the time required to raise the temperature to the desired temperature. The calculated time is used as a variable for controlling the speed of thermal input to the zone to be air conditioned. The shape of the zone temperature responding curve as shown in FIG. 3 is known.

Assume that the necessary time calculated from FIG. 2 is equal to t (time point that the temperature rise of 88.8 % of the necessary temperature is obtained). In this case, the main controller (1) monitors the temperature response as the function offo time, and compares it with the desired responding curve in FIG. 4. If it is judged that the response is excessively fast, the air damper (62) of the zone to be air conditioned is controlled in the closing direction (If the windage amount is excessively large, the comfortability decreases and noise increases). On the contrary, if it is judged that the response is excessively slow, the air damper (62) is controlled in the opening direction (If the windage amount is excessively small, the room temperature does not arrive at the set temperature or it takes much time). The exhaust air dampers (65) of the zones to be air conditioned are always fully-opened except when the corresponding supply air damper (62) is completely closed.

Figure 5:
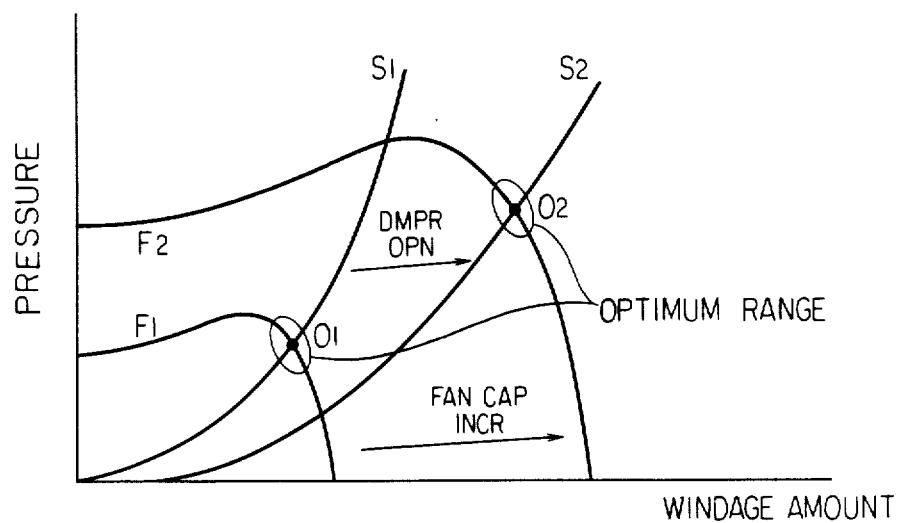
FIG. 5 is a diagram illustrating the relationship between the windage amount and the pressure of a blower fan in FIG. 1.

After the room thermostat (55) of the zone to be air conditioned is read out and the damper (62) is regulated, the capacity of the fan (40) is regulated. The windage amount of the air stream flowed through the blower fan (40) is altered by the controller (42) of an inverter. As shown in FIG. 5, when the damper (62) is opened, the windage amount-pressure curve (system curve) of the duct system is displaced externally from $S_1$ to $S_2$ as designated by arrows. Thus, in order to hold the operation of the blower fan (40) in an optimum range, it is necessary to externally displace the fan curve from $F_1$ to $F_2$ as designated by arrows by accelerating the rotating speed of the fan. Thus, the operating point can be displaced from $O_1$ to $O_2$ falling within the optimum range.

The pneumatic pressure in the blower fan (40) is monitored by the pneumatic pressure sensor (43) so as to control the feedback of the windage amount of the fan (40). The reading of data from the sensor (43), related calculation and the output of a windage amount control signal are performed by the microprocessor (41) used only to control the blower fan (40).

Figure 6:
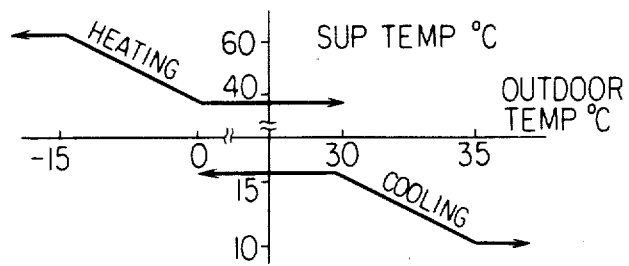
FIG. 6 is a diagram showing the relationship between the outdoor temperature and the supply air temperature in the air conditioning system in FIG. 1.

In order to set the temperature in the duct (60) to the desired temperature subsequently to the regulation of the volume of the fan (40), heat input speed is altered. Though the desired temperature is not constant, it is a function of the outdoor temperature reading value as shown in FIG. 6 so as to save the energy. In other words, if the efficiencies of the heat pumps (10) and (20) decrease due to the excessively high air supplying temperature in winter or the excessively low air supplying temperature in summer, the heat outputs of the heat sources (the heat pumps (10), (20) or the gas burner (30)) are individually regulated until the supplying air temperature falls in a range capable of being allowed as the desired value.

When the air dampers (62) and (65), the blower fan (40) and the heat sources (the heat pumps (10), (20) or the gas burner (30)) are regulated, the air conditioning system falls in a new ordinary state. In this state the relative air flow to the respective zones to be air conditioned has already altered as the entire air stream and the entire heat input have varied.

The abovementioned sequence is again started when the temperatures of the zones to be air conditioned are read out by the room thermostats (55) of the respective zones, and the air dampers 62 starts again regulating.

Figure 4:
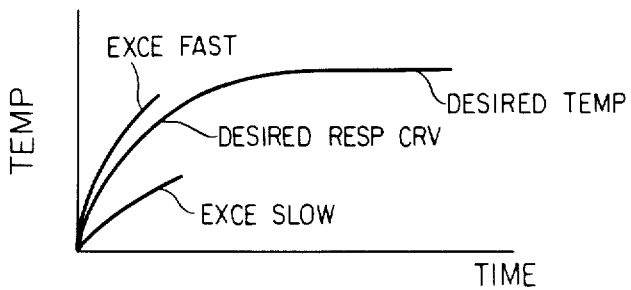
FIG. 4 is a diagram illustrating a temperature response curve in the air conditioning system in FIG. 1.

The sequence of the operation in the abovementioned heating operation mode is also similar in the cooling operation mode except that the relationship between the desired temperature of the zone and the actual temperature of the zone are reverse and that the room temperature responses in FIGS. 3 and 4 are not upward but downward.

The selection of cooling or heating operation mode is conducted by switching by the user the master switch (50). Which of the gas burner (30) and the heat pumps (10), (20) is used as the heat source in the heating operation mode is determined by the resulting of the calculation in the main microprocessor (1). In other words, since the operating efficiencies of the heat pumps (10), (20) decrease as the outdoor temperature falls, the heat pumps (10), (20) are operated while the operating efficiencies of the heat pumps (10), (20) are high, and the gasburner (30) is operated when the use of the gas burner (30) is economical as compared with the use of the heat pumps (10), (20).

When the air conditioning system is installed, the worker inputs the unit costs of the drive energy of the heat pumps (10), (20) and the drive energy gas of the gas burner (30) to the main controller (1) by using a portable digital input/output unit mounted in a service port (52), and these unit costs can switch the heat sources at the optimum point so that the cost of the energy becomes minimum by continuously monitoring the operating efficiencies of the heat pumps (10), (20) and calculating the operating cost by the main controller (1).

Three main mechanical elements, i.e., the heat pumps (10), (20) the gas burner (30) and the blower fan (40) are separately formed to be distinguished from each other, and they can take three modes corresponding to the operation modes of the air conditioning system. More specifically, in the extremely cold heating operation mode, the fan (40) and the gas burner (30) form a gas furnace used only for the same mode. Further, in the cooling operation mode and the ordinary heating operation mode, the fan (40), the expansion heat exchanger (20) and the outdoor unit (10) form a heat pump unit used for cooling and heating.

The abovementioned three mechanical elements might be all used simultaneously. At this time, the gas burner (30) operates as an auxiliary heat source capable of switching between the heat pumps (10), (20) and the gas burner (30) when the outdoor temperature becomes extremely low.

The presence or absence of the gas burner (30), the outdoor unit (10) and the air dampers (62), (65) can be detected by an electric signal input to and output from the main controller (1). To this end, the system can be constructed in combinations of various elements without altering the software in the main controller (1). Since the system can identify the constituents automatically installed, the worker may merely connect among various elements by plugs and the like.

The air conditioning system of the present invention has high universality in the consitution of such central units and also high flexibility in the number and width of the zones to be air conditioned. One to five or more zones to be air conditioned can be simultaneously air conditioned within a range not exceeding the capacity of the central unit without altering the software in the main controller (1), and can be simultaneously air conditioned in combination with wide and narrow zones to be air conditioned.

The main microprocessor and the master switch will be described in more detail.

Figure 7:
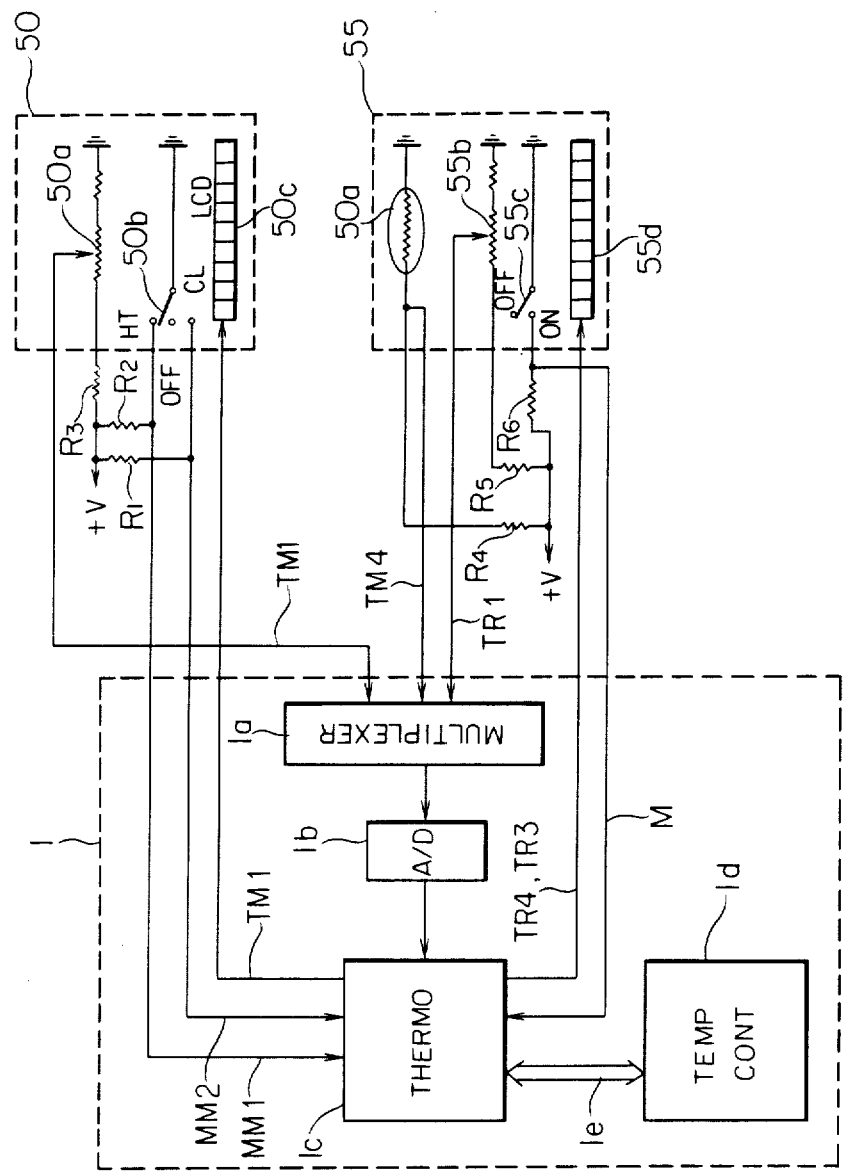
FIG. 7 is a block diagram illustrating a partial circuit of a master switch, a room thermostat and a main controller.

FIG. 7 is a block diagram including partial circuit of the embodiment of the present invention. Reference numeral (50) designates a master switch for simultaneously setting the temperatures of a plurality of rooms installed such as living rooms, which has main temperature setting means for producing a signal corresponding to a present set (i.e. control) temperature (TM1) selected by the switch (50), i.e., a variable resistor (50a), main mode switching means for producing state signals (generally called "MM") corresponding to "heating" signal (MM1), "cooling" signal (MM2) or "OFF" state, i.e., 3-point switch (50b), and a main display unit (50c) made of a liquid crystal for displaying the present set temperature (TM1) by the resistor (50a). ($R_1$) to ($R_3$) are resistors connected among the resistor (2) and the switch (50b), and a power source (+V).

In FIG. 7, (55) designates room thermostats provided in the individual rooms for setting the temperatures in the individual rooms, and the same constructions, not shown, are provided in the respective rooms. The room thermostat (55) has temperature detecting means for detecting the temperature of the room, to which the room thermostat belongs, i.e., the present temperature (TR4), i.e., a thermistor (55a), room temperature setting means for producing a signal corresponding to the present set temperature (TR1) selected by the room thermostat (55), i.e., a variable resistor (55b), room mode switching means for producing a state signal (generally called "M") corresponding to "ON/OFF" of the air conditioning operation of the corresponding room, i.e., two-point switch (55c) and room display unit (55d) made of a liquid crystal for displaying the present temperature (TR4) of the corresponding room and the control temperature (TR3) of the room. ($R_4$) to ($R_6$) designate resistors connected among the thermistor (55d), the variable resistor (55b), the two-point switch (55c), and the power source (+V).

In FIG. 7, (1a) designates a multiplexer which multiplexes the input signals corresponding to the present set temperature (TM1) from the resistor (50a), the present set temperature (TR1) of the room thermostat (55) and the present temperature (TM4) in a time division manner. (1b) designates an A/D converter for converting the analog output from the multiplexer (1a) into a digital signal.

In FIG. 7, designates a thermostat controller composed of a microcomputer, which inputs the temperatures (TM1), (TR1) and (TM4) together with the state signals (MM) and (M) respectively set by the three point and two-point switches (50b), (55c). The thermostat controller (1c) has a memory as memory means for always memorizing the present set temperature (TM1) and (TR1) of the master switch and the room thermostat as the previously set temperatures (TM2) and (TR2) and a calculator as temperature deciding means for detecting the presence or absence of the alteration of the present set temperature (TM1) or (TR1) by always comparing the previously set temperature (TM2) and (TR2) with the present set temperatures (TM1) and (TR1) and deciding the present set temperature after the alteration immediately when the alteration exists as the control temperature (TR3), displays the present set temperature (TM1) of the master switch (50) on the main display unit (50c) and outputs drive signals for displaying the present temperature (TR4) of the corresponding room and the control temperature (TR3) on the room display unit (55d).

In FIG. 7, designates a temperature controller connected with the thermostat controller (1c) through a bus (1e), which outputs a clock signal and a signal corresponding to the number (R) of the previously input rooms to the controller (1c) and inputs signals corresponding to the state signal (MM) of the master switch (50), the state signal (M) of the room thermostat (55), the control temperatures (TR3) the present temperatures (TR4) of the rooms from the controller (1c). The controller (1d) suitable control to open or close the air damper (not shown) communicating with the respective rooms in accordance with the respective input signals to control the temperatures so that the present temperatures (TR4) of the rooms respectively coincide with the control temperatures (TR3) of the rooms known per se. The main controller (1) is constructed of the (1a) to (1e).

Figure 8:
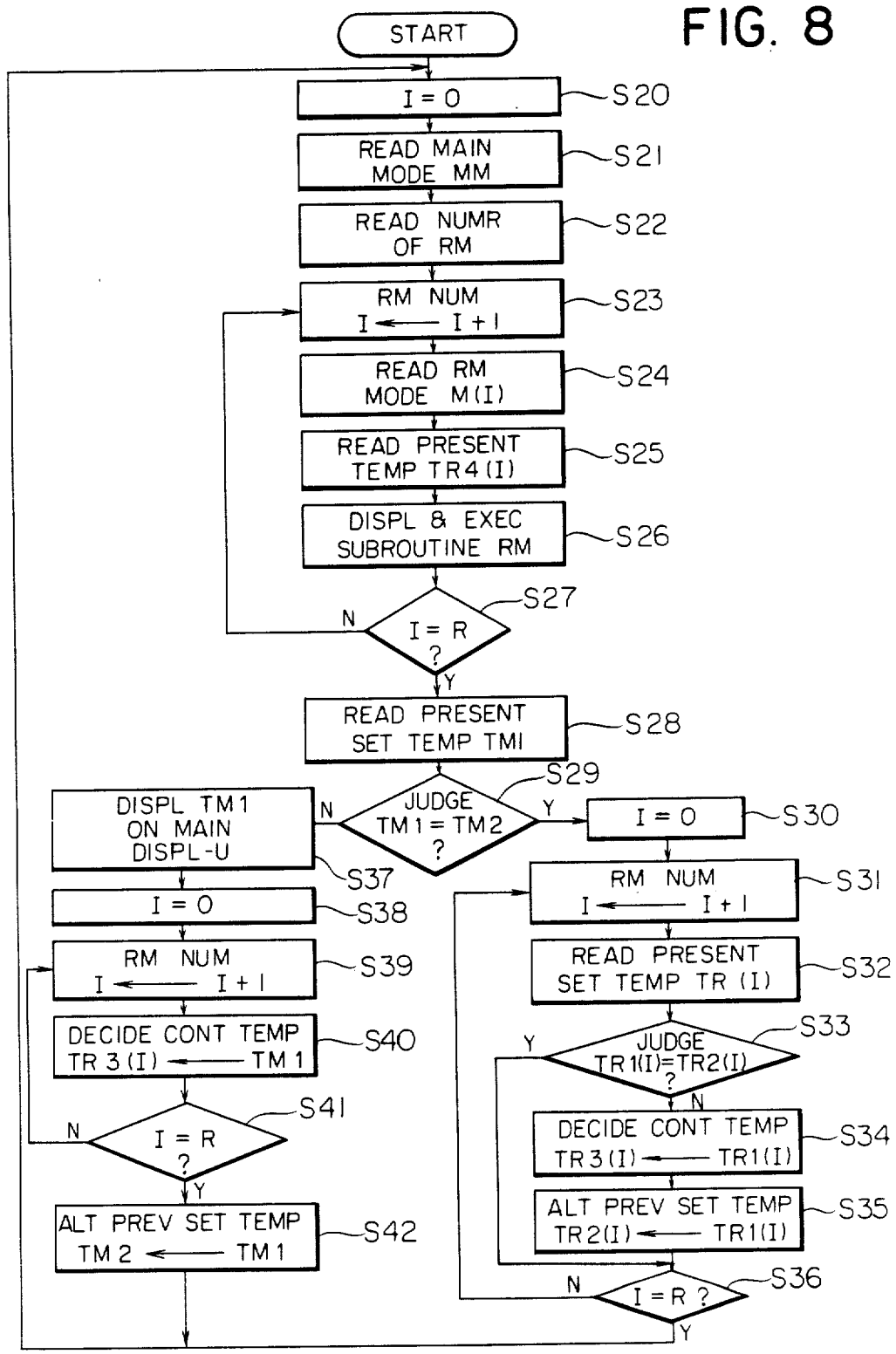
FIG. 8 is a flow chart illustrating the operation of a thermostat controller in FIG. 7.
Figure 9:
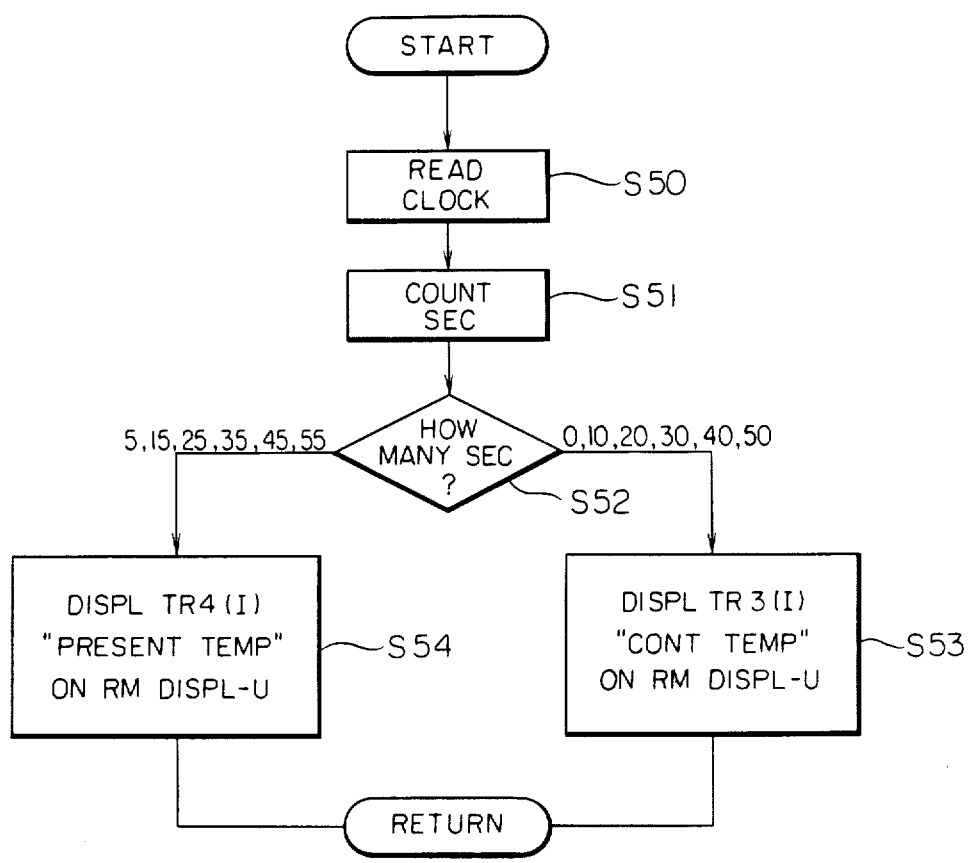
FIG. 9 is a flow chart illustrating the subroutine "room display" (step S 26) of FIG. 8.
Figure 11:
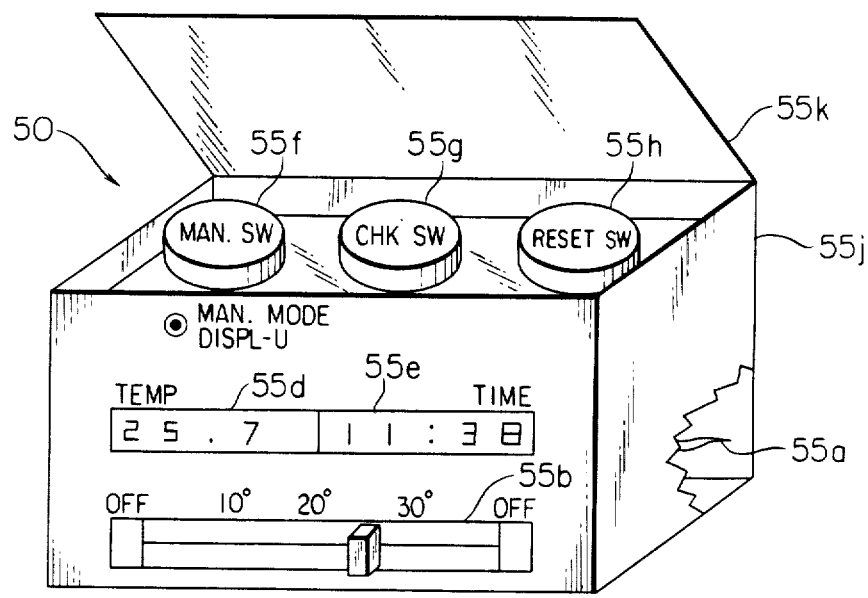
FIG. 11 is an electric circuit diagram of the room thermostat of FIG. 10.

FIG. 8 is a flow chart illustrating the sequence of the memory means and the temperature detecting means in the thermostat controller (1c), and FIG. 9 is an operation flow chartof room display means of FIG. 8, i.e., means for "displaying the room" of a subroutine.

The operation of the thermostat controller (1c) will be described with reference to flow charts of FIGS. 8 and 9. In step (S20), in order to count room numbers I from 1 to R, a loop variable I is initialized to zero. In step (S21), the state signal (MM) of the master switch (50) is read in. The controller drives the heat pump or the gas burner (not shown) in case of "heating", drives to cool the heat pump in case of "cooling", and stops the heat pump and the gas burner in case of "OFF" through the temperature controller (1d) in response to the respective, user-selected states. In step (S22), the controller reads in the room numbers R set through the bus (1e) from the temperature controller (1d). In step (S23), the controller sets the room number I, and executes, for each room beginning from the room No. 1, the following steps (S24) to S26). In step (S24), the controller reads in the state signal (M(I)) of the room thermostat (55) of the room No. I, controls the temperature of the room in case of "ON" state, but does not control the temperature in case of "OFF" state. In step (S25), the controller reads in the present temperature (TR4(I)) of the room, and executes a subroutine "room display" in FIG. 9 in step (S26).

In step (S26), i.e., in the subroutine "room display", the controller inputs a clock signal from the temperature controller (1d) in step (S50), and counts the seconds in step (S51). In step (S52), the controller converts the seconds to the time divisions at every 5 sec., and alternatively display the control temperature (TR3) and the present temperature (TR4) on the room display unit (55d) at every 5 sec. More specifically, in step (S53), the controller displays the control temperature (TR3(I)) during the period 0 to 5 sec., during 10 to 15 sec.,., during 50 to 55 sec., returns to display the present temperature (TR4(I)) of the room from the thermistor (55d) during 5 to 10 sec., ., during 55 to 60 sec., and returns it to the main flow chart of FIG. 8. The alternative displays are performed to save the area of the room display unit (55d), but simultaneously displayed in case that sufficient displaying area is provided.

In step (S27), the controller decides whether the room number I has arrived at the R-th room (the last room) or not. It not, the controller returns to the step (S23), and repeats the abovementioned operations for the next (I+1)-th room.

In step (S27), when the controller confirms to arrive at the R-th room, the controller reads out the present set temperature (TMI) of the main thermostat (1) in step (S28). In step (S29), the controller compares the set temperature of the master switch (1) immediately before the present set stored in advance in a memory (not shown). When the present set temperature (TM1) does not alter, i.e., when TM1=TM2, the controller initializes the loop variable (I) to zero in step (S30), and judges whether there is an alteration in the present set temperatures of the respective rooms or not while sequentially increasing the room number I from 1. In step (S32), the controller reads out the present set temperature (TR1(I)) of the room thermostat (55) of I-the room. In step (S33), the controller compares the set temperature of the room thermostat (55) immediately before the present set stored separately in advance in the memory, i.e., the previously set temperature (TR2(I)) with the present set temperature (TR1(I)) and jusges whether there is an alteration in the set temperature or not. When the present set temperature (TR1(1)) of the room thermostat (55) of the I-th room is altered, i.e., when TR1(I)≠TR2(I), the controller judges that there is an alteration, alters the control temperature (TR3(I)) used to control the temperature by the temperature controller (1d) to the present set temperature (TR1(I)), and stores in the memory, in step (S34). After this alteration, the temperature controller (1d) controls the I-th room temperature in accordance with the control temperature (TR3(I)). In step (S35), the controller stores new present set temperature (TR1(I)) as the previously set temperature (TR2(I)). In the step (S33), when there is no alteration in the present set temperature (TR1(I)), i.e., when TR1(I)=TR2(I), the controller skips the steps (S34) and (S35) to step (S36).

In the step (S36), the controller returns to the step (S31) until the room number I arrives at the R, repeats the steps (S32) to (S35). When the controller has completed the above operations for all the rooms and arrived at I=R, it returns to the step (S20).

On the other hand, when the controller judges TM1≠TM2 and judges that there is an alteration in the present set temperature (TM1) of the master switch (50) in step (S29), the controller displays the present set temperature (TM1) after the main display unit (50c) is altered in step (S37). The display of the display unit (50c) is does not alter until the present set temperature (TM1) is again altered. In step (S38), the controller initializes the loop variable (I) to zero in step (S38), sequentially increases the room number I in step (S39), alters the control temperature (TR3(I)) of the I-th room to the present set temperature (TM1) of the main thermostat (1), and stores it in the memory, in step (S40). In step (S41), the controller repeats the steps (S39) and (S40) until becoming I=R in step (S41), and alters the control temperatures (TR3) of the all rooms to the present set temperatures (TM1) after alternation. Therefore, the temperature controller (1d) controls the temperatures of all the rooms by the new control temperature (TR3).

In step (S42), the controller stores the present set temperature (TM1) after alteration as the previously set temperature (TM2) of the master switch (50). In other words, the set temperature immediately before the set is altered is always stored as the previously set temperature (TR2). The controller then returns to step (S20), and repeats the execution of a main flow chart in FIG. 8. This repeating speed depends upon the processing speed of the microprocessor of the thermostat controller (1c), and is normally a loop period of 1 second or less. Therefore, in the flow chart of FIG. 8, the controller judges whether there is an alteration or not in the present set temperature (TM1) of the master switch (50) in step (S29), and then judges there there is an alteration in the present set temperature (TR1) of the room thermostat (55) or not in step (S33), but the present set temperature (TM1) of the master switch (50) may not always prefer to the present set temperature (TR1) of the room thermostat (55).

In other words, the controller always compares the present set temperature (TM1) or TR1) when altered by the user, with the previously set temperature (TM2) or (TR2) irrespective of the master switch or the room thermostat in step (S29) or S33), thereby always applying the new present set temperature as the control temperature (TR3) to the temperature controller (1d). Therefore, even if incoincidence of the present set temperatures (TM1) and (TR1) occurs between the master switch (50) and the room thermostat (55), the priority is given to the one finally operated by the user, thereby causing no failure.

For example, assume that the state (MM) of the master switch (50) is set to heating (MM1) and the present set temperature (TM1) is set to 16° C. At this time, the main display unit (60c) displays "16° C." in step (S37), the state signal (M) of the room thermostat (55) becomes ON, i.e., hot air is supplied by the temperature controller (1d) to the room of the operation mode. If the present temperature (TR4) of the room is 12° C., the room display unit alternately displays "16° C." of the control temperature (TR3) and "12° C." of the present temperature (TR4) at every 5 sec. in step (S26). The present temperature (TR4) arrivs at the control temperature (TR3) as the time elapses.

Assume that the user sets the present set temperature (TR1(1)) of the room thermostat (55) of the first room to 20° C. and sets the presetn set temperature (TR1(2)) of the room thermostat (55) of the second room to 25° C. The controller can judge that the present set temperatures are respectively altered in the corresponding first and second rooms in step (S33). Therefore, in step (S34), the controller alters the control temperature (TR3(1)) of the first room to 20° C. and the control temperature (TR3(2)) of the second room to 25° C. Thus alterations can be immediately confirmed by the user on the respective room display units (55d).

Then, if the user alters the present set temperature (TM1) of the master switch (50) to 22° C., the controller confirms the alteration in step (S29), and alters the control temperatures (TR3) of the all rooms including the above first adn second rooms to 22° C. This present set temperature (TM1) is displayed on the main display unit (55d) in step (S37), and displayed as the control temperature in the all room display units (55d), and the users in the respective rooms can immediately recognize the alteration.

Therefore, if the user, for example, in the second room who is not satisfied with the control temperature of 22° C. further alters the present set temperature (TR1(2)) of the room thermostat (55) to 18° C., since the previous set temperature (TR2(2)) was 25° C., the alteration is again recognized in step (S33), and the present set temperature after alteration), i.e., 18° C. becomes the control temperature (Tr3(2)) of the second room, in step (S34). If it is desired to return the control temperature to the same temperature as the previously set temperature of the room thermostat, it may be returned after the variable resistor (55b) is slightly moved.

Thus, the control temperature (TR3) is always obtained preferentially to the temperature set operation of the thermostat by the last user. The temperature controller (1d) receives information relative to the state (MM) or (M) from the thermostat controller (1c) together with the control temperatures (TR3) of the respective rooms and the present temperature (TR4), and continuously controls so that the respective rooms arrive at the control temperatures (TR3).

In the embodiment described above, the operations of the individual room thermostats (55) relate only to the corresponding room, while the operation of the master switch (50) relate to the controls of all the rooms. However, the detection of the preferential sequence transfer is performed in accordance with the thermostat substantially finally operated or finished to be operated.

It is noted that the control temperatures (TR3) of the individual rooms set by the respective room thermostats (55) can be altered by the operation of the master switch (50), but this does not become a problem as an air conditioning system for a residence of a general domestic people, because the users are considered to have sufficient communication of the mutual intentions.

Figure 10:
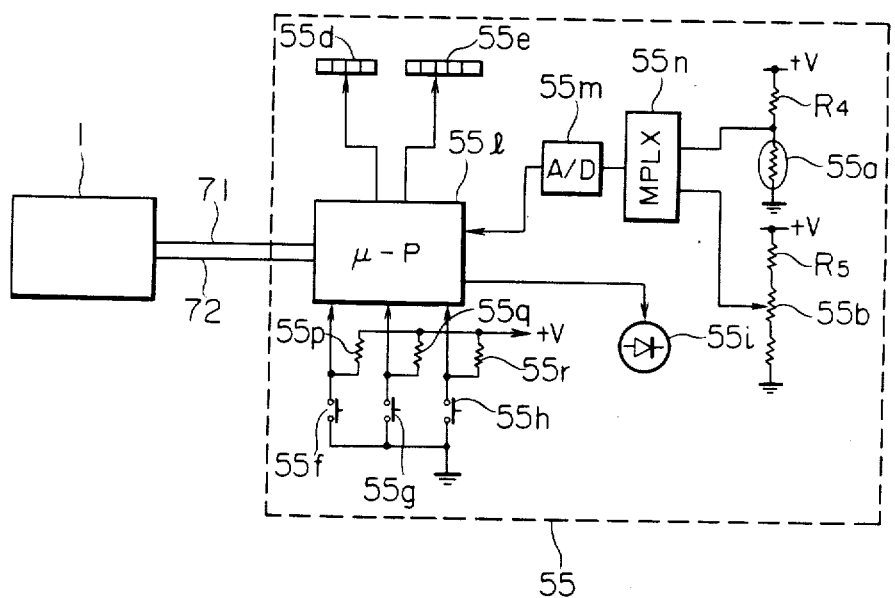
FIG. 10 is a perspective view of the external appearance of a room thermostat.

A schedule control for setting temperature in a room thermostat at a predetermined time according to another embodiment of the present invention will be described. In this embodiment in FIG. 10, (50) designates a room thermostat capable of disposing on a wall, (55d) designates a digital temperature display unit made of a liquid crystal display element, (55e) designates a digital time display unit similarly made of a liquid crystal display element, (55f) designates a manual mode selection pushbutton switch (hereinbelow referred to as "a manual switch"), (55g) designates a check mode selecting pushbutton switch (hereinafter referred to as "a check switch"), (55h) designates a reset mode selecting pushbutton switch (hereinafter referred to as "a reste switch"), (55i) designates a manual mode display unit made of a light emitting diode, (55a) designates temperature sensing means made of a thermistor, (55b) designates a temperature selecting slider switch made of a variabel resistor, (55j) designates a case of the room thermostat (55), and (55k) designates a cover of the room thermostat (55). In Fig. 10, (1) designates a main processor, (55l) designates a microprocessor provided in the room thermostat (55), (55m) designates an A/D converter, (55n) designates a multiplexer, (55p) and (55r) designate resistors, (71) designate an input line from the main controller (1) to the microprocessor (55l), and (72) designates an output line from the microprocessor (55l) to the main controller (1).

The main controller (1) supplies through the input line (71) various messages, real clock time and power displayed on the digital temperature display unit (55d) and the digital time display unit (55e) to the microprocessor (55l). The detected temperature from the temperature sensing means (55a) and the set temperature at the time for reading out the set temperature from the microprocessor (55l) are supplied through the output line (72) to the main controller (1).

Then, the operation of the room thermostat of the embodiment constructed as described above will be described with reference to the flow charts of FIGS. 12 and 13.

In the ordinary operation mode, the temperature at the present time detected by the temperature sensing means (55a) is displayed on the digital temperature display unit (55d). Simultaneously, the real clock time supplied from the main controller (1) is displayed on the digital time display unit (55e). If the temperature alters, the sensing means (55a) detects it and the correct temperature
is immediately displayed on the digital temperature display unit (55d).

Figure 12:
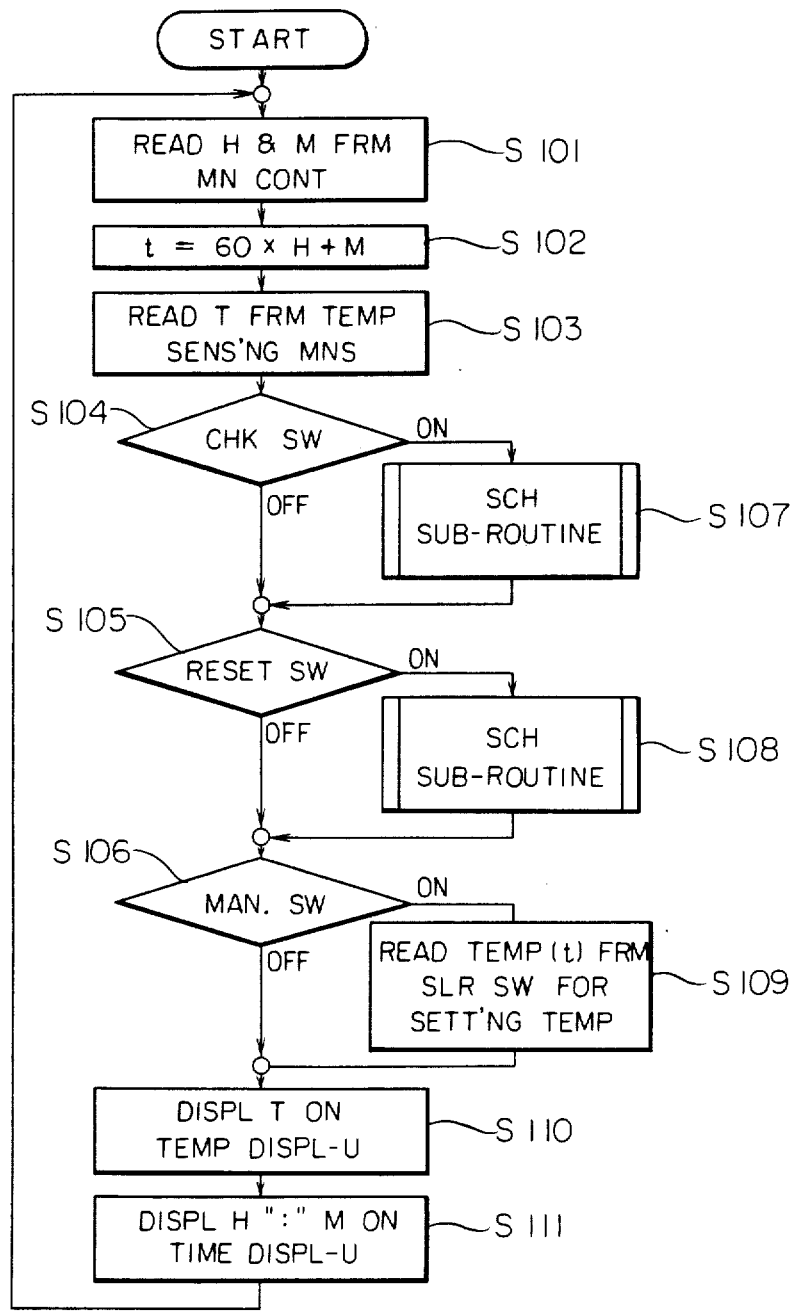
FIG. 12 and FIG. 13 are flow charts illustrating the process of a microprocessor shown in FIG. 11.

In the flow chart of the main program in FIG. 12, the microprocessor (55l) reads in the hour H and the minute M from the main controller (1) through the input line (71) in step (S101), and sets the calculated value of 60×H+M in a minute counter t in step (S102). Then, in step (S103), the temperature sensing means (55a) reads out the room temperature T. Subsequently, the microprocessor sequentially judges whether the check switch (55g), the reset switch (55H) and the manual switch (55f) are closed or not in steps (S104), (S105), (S106), respectively. Since no switch is closed, the digital temperature display unit (55d) displays the present temperature T and the digital time display unit (55e) displays the present hour H and the minute M.

Then, if the reset mode switch (55h) is closed to select the reset mode, new temperature schedule can be input through the slider switch (55b) for selecting the temperature. In this reset mode, one day temperature schedule is displayed on the digital temperature display unit (55d) and the digital time display unit (55e), over a 3 minute interval. If the slider switch (55b) for selecting the temperature is operated while observing the predetermined time displayed on the display unit (55e), the set temperature selected by the switch (55b) is displayed and input to the digital temperature display unit (55d). When the three minutes have elapsed, the room thermostat (55) automatically returns to the ordinary operation mode.

Figure 13:
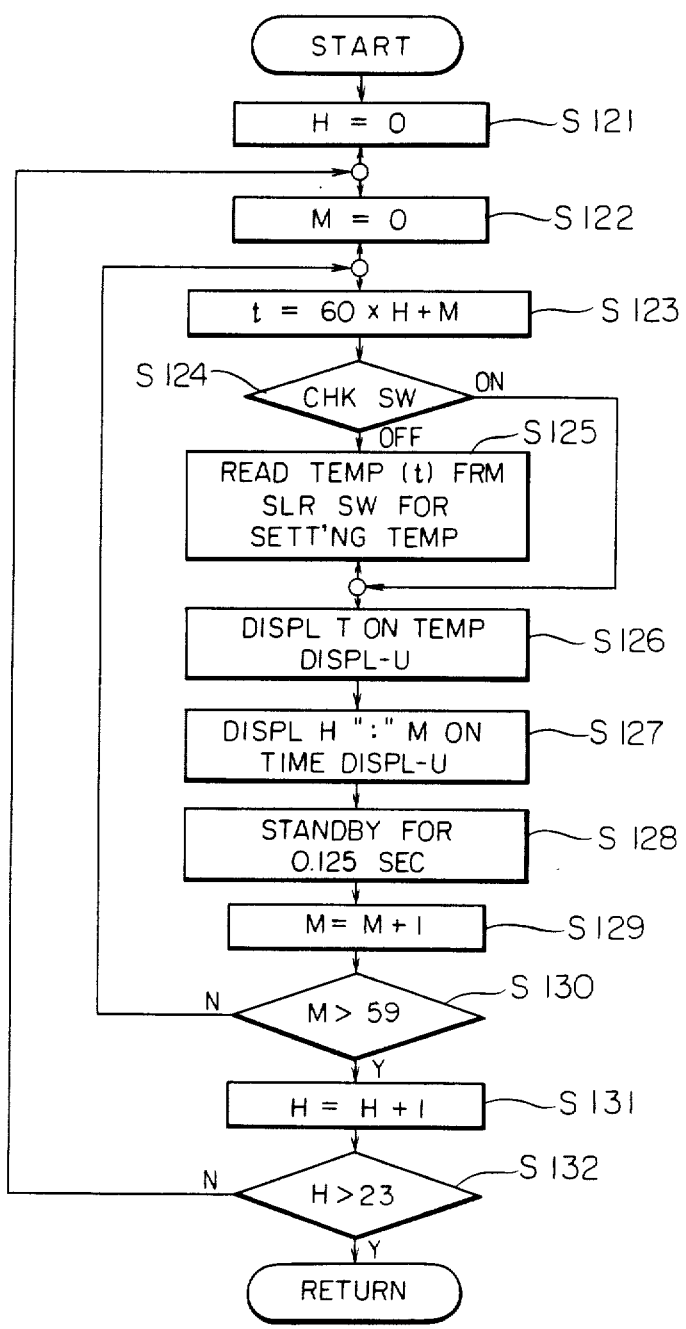

In the flow chart of the main program shown in Fig. 12, in step (S105), the microprocessor judges whether the reset switch (55h) is closed or not and skips to the schedule subroutine shown in FIG. 13. In the schedule subroutine, the hour H and the minute M are respectively reset to 0 in steps (S121) and S122), and the calculated value of 60×H+M is set in the minute counter t is step (S123). Subsequently, in step (S124), whether the check switch (55e) is NO or OFF is judged. Since the switch is OFF, the set temperature TEMP(t) is read out from the slider switch (55b) for selecting the temperature in step (S125), and the read set temperature T is displayed on the display unit (55d) in step (S126). In step (S127), the hour H and the minute M of the predetermined time are displayed on the display unit (55e). Then, in step (S128), in order to observe the set temperature at the predetermined time, a standby time of 0.125 second is produced. Then, in step (129), the minute M is increased by 1, and in step (S130), whether M>59 or not is judged. If NO, it is returned to step (S123), and M of the step (S122) is increased by 1. This process is repeated, and when M>59 is obtained in step (S130), it is advanced to step (S131), the hour H is increased by 1. Then, in step (S132), whether H>23 or not is judged. If NO, it is returned to step (S122), the H of the step (S121) is increased by 1, and the same process as above is executed. This process is repeated for 24 hours, i.e., 24×60=1440 times. Therefore, one day set temperature is set for a short time of 3 minutes. Then, when the 3 minutes have elapsed, it is returned through the schedule subroutine to the main program of FIG. 12, and it is returned to the ordinary operation mode.

Subsequently, when the check switch (55g) is closed to select the check mode, one day temperature schedule input in the reset mode is displayed on the display units (55d) and (55e) in 3 minutes. When the 3 minutes have elapsed, the room thermostat (50) is automatically returned to the orindary operation mode.

In the flow chart of the main program shown in FIG. 12, it is skipped to the schedule subroutine shown in FIG. 13 in the judgement whether the check switch (55g) is closed or not. In the schedule subroutine, in step (S124), whether the check switch (55g) is ON or OFF is judged. Since the switch (55g) is ON, the set temperature TEMP(t) from the slider switch (55b) for selecting the temperature is read, in step (S125). Therefore, the set temperature T input in the previous reset mode is displayed on the display unit (55d), and the temperature schedule on one day is displayed on the display units (55d) and (55e) in a short time of 3 minutes. When the 3 minutes have elapsed, it is returned through the schedule subroutine to the main program of FIG. 12, and returned to the ordinary operation mode.

When the manual switch (55f) is closed to select the manual mode, in the flow chart of the main program shown in FIG. 12, in step (S106), whether the manual switch (55f) is closed or not is judged. Since the switch is ON, in step (S109), the set temperature is read out from the slide switch (55b) for selecting the temperature, and the set temperature is replaced by the temperature already set as the set temperature TEMP (t) set at present. While the manual switch (55f) is closed, the display unit (55i) indicates that the manual mode is selected.

When the manual switch (55f) is opened, the display unit (55i) is extinguished, and temperature control is executed in accordance with the preset set temperature, and returned to the ordinary mode.

Further, the embodiment of initializing air damper opening and closing means of the present invention will be described.

Figure 14:
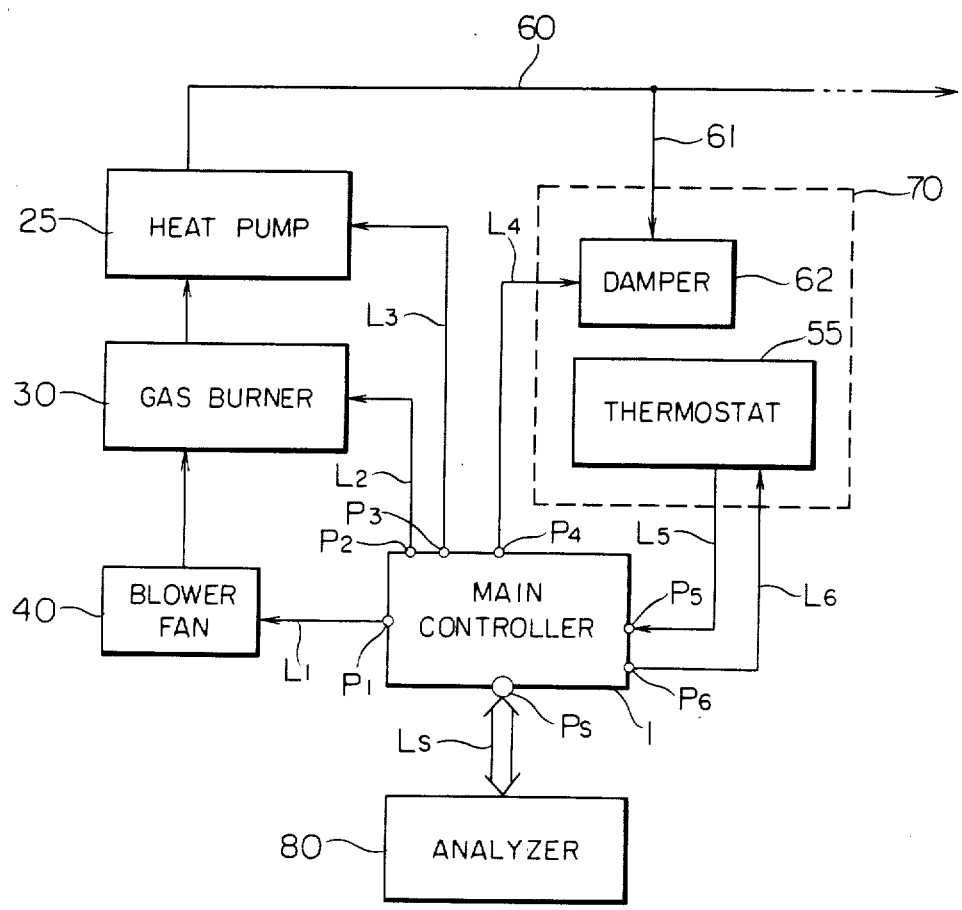
FIG. 14 is a block diagram of one embodiment showing the disposition of an analyzer.

In FIG. 14, (40) designates a blower fan, (60) designates an air supply duct, (30) designates a gas burner, (25) designates a heat pump, and the gas burner (30) and the heat pump (25) construct an air conditioner.

In FIG. 14, (60) designates the air supply duct to an individual room, which has a damper (62) for opening and closing air from a branch duct (61), and a thermostat (55) for detecting the temperature of the room. A plurality of rooms of the same construction as above are, though not shown, provided, and air is distributed from the air conditioner through the branch duct (61) to the respective rooms.

In FIG. 14, (1) designates a main controller which contains a microprocessor and a memory (RAM), not shown, controls to drive the blower fan (40), the gas burner (30) of the air conditioner and the heat pump (40) as well as the damper (62) through a plurality of plug-in ports ($P_1$) to ($P_6$) of the microprocessor and control lines ($L_1$) to ($L_4$) coupled through the plurality of plug-in ports ($P_1$) to ($P_6$) of the microprocessor, obtains a room temperature signal from the thermostat (55) from a control line ($L_5$), and applies signals for displaying the control temperature and the present temperature on the display unit of the thermostat (55) from a control line ($L_6$).

In FIG. 14, (80) designates an analyzer which has a portable keyboard, a display unit and a printer, which can be plugged into the main controller (1), i.e., detachable through a service port (Ps) of the microprocessor in the main controller and a service control line (Ls) coupled corresponding to the port. The analyzer (80) contains a plurality of initializing programs to be described later.

In FIG. 14, the operation of the air conditioner except the analyzer (80) will be described. The main controller (1) counts in advance the number (R) of the rooms and stores the value (R) in the memory. The main controller has an output port ($P_4$) for the damper, input/output ports ($P_5$) ($P_6$) for the thermostat, and control lines ($L_4$) to ($L_6$) respectively connected with the ports ($P_4$) to ($P_6$) from 1 to R corresponding to the number (R) of the rooms, and connected to the dampers (62) and the thermostats (55) in the respective rooms (70) from 1 to R. The number of the ports ($P_4$) to ($P_6$) of the main controller (1) is prepared in sufficient number corresponding to the arbitrary number (R) of the rooms.

The main controller (1) drives to open or close the damper (62) through the control line ($L_4$) while detecting the present temperature (Tn) from the thermostat (55) through the control line ($L_5$) with the temperature set by the master switch, not shown, or the thermostat (55) in each room as the control temperature, and controls so that the present temperature (Tn) of each room coincides with the desired control temperature.

As described above, the damper (62) and the thermostat (55) of each room connected with the ports ($P_4$) to ($P_6$) are driven and processed by the microprocessor in the main controller 1. Since information regarding the adaptability (as discussed below with reference to FIG. 17) of these ports ($P_4$) to ($P_6$) to the damper (62) and the thermostat (55) as well as whether the air conditioners are connected with the ports ($P_2$), ($P_3$) or not are stored in the memory in the main controller (1) by the initialization, the air conditioning control can be very accurately and efficiently performed.

Figure 15:
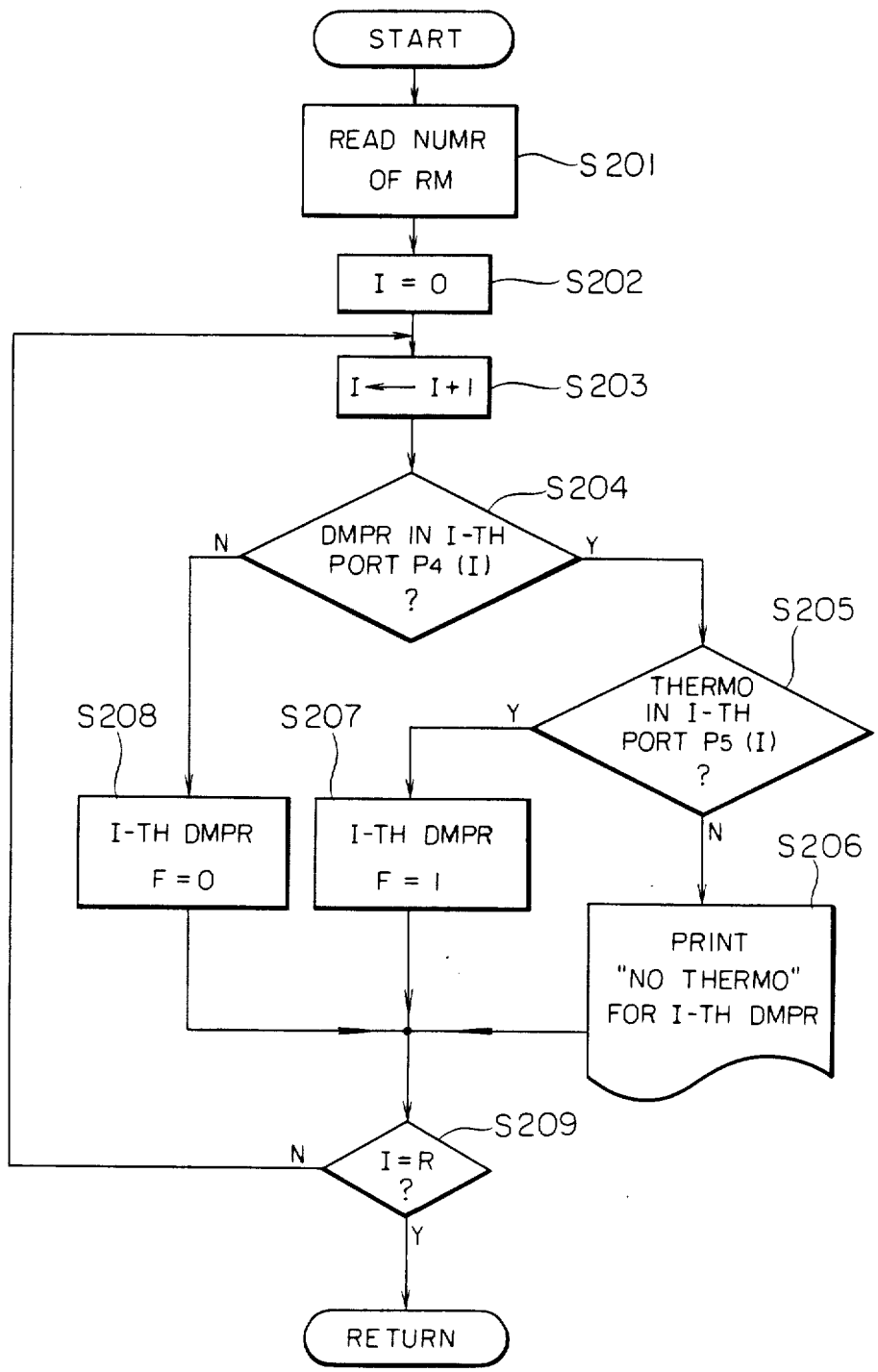
FIGS. 15 to 18 are flow charts illustrating different initializing programs stored in the analyzer of FIG. 14.
Figure 16:
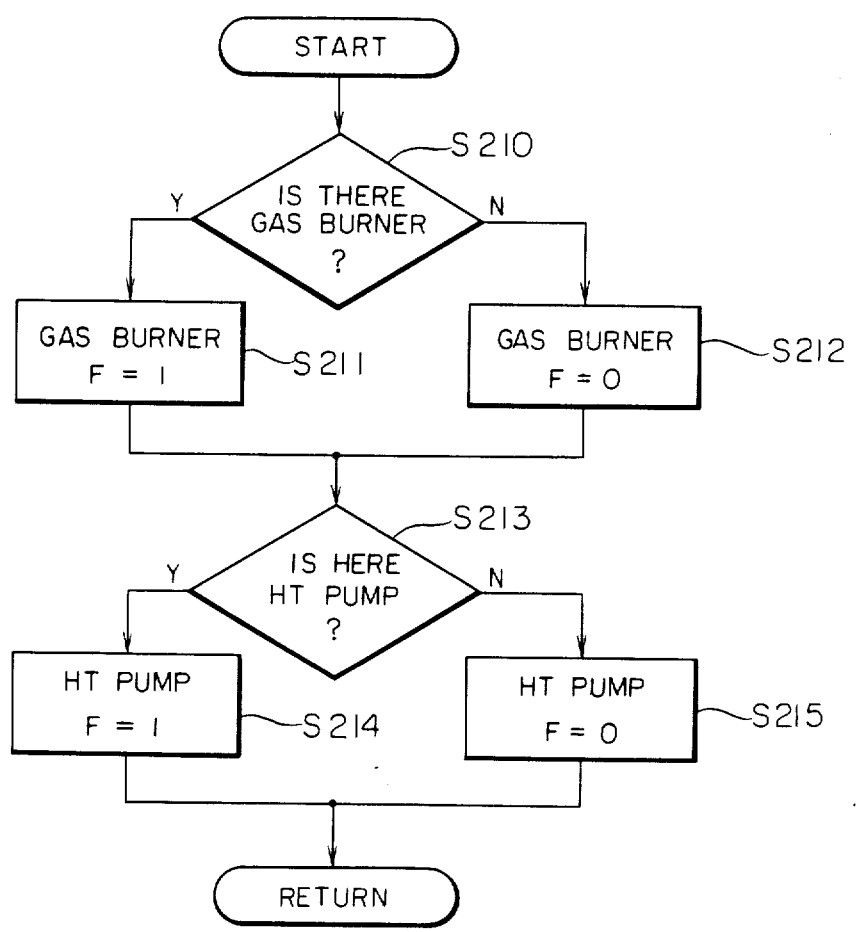
Figure 17:
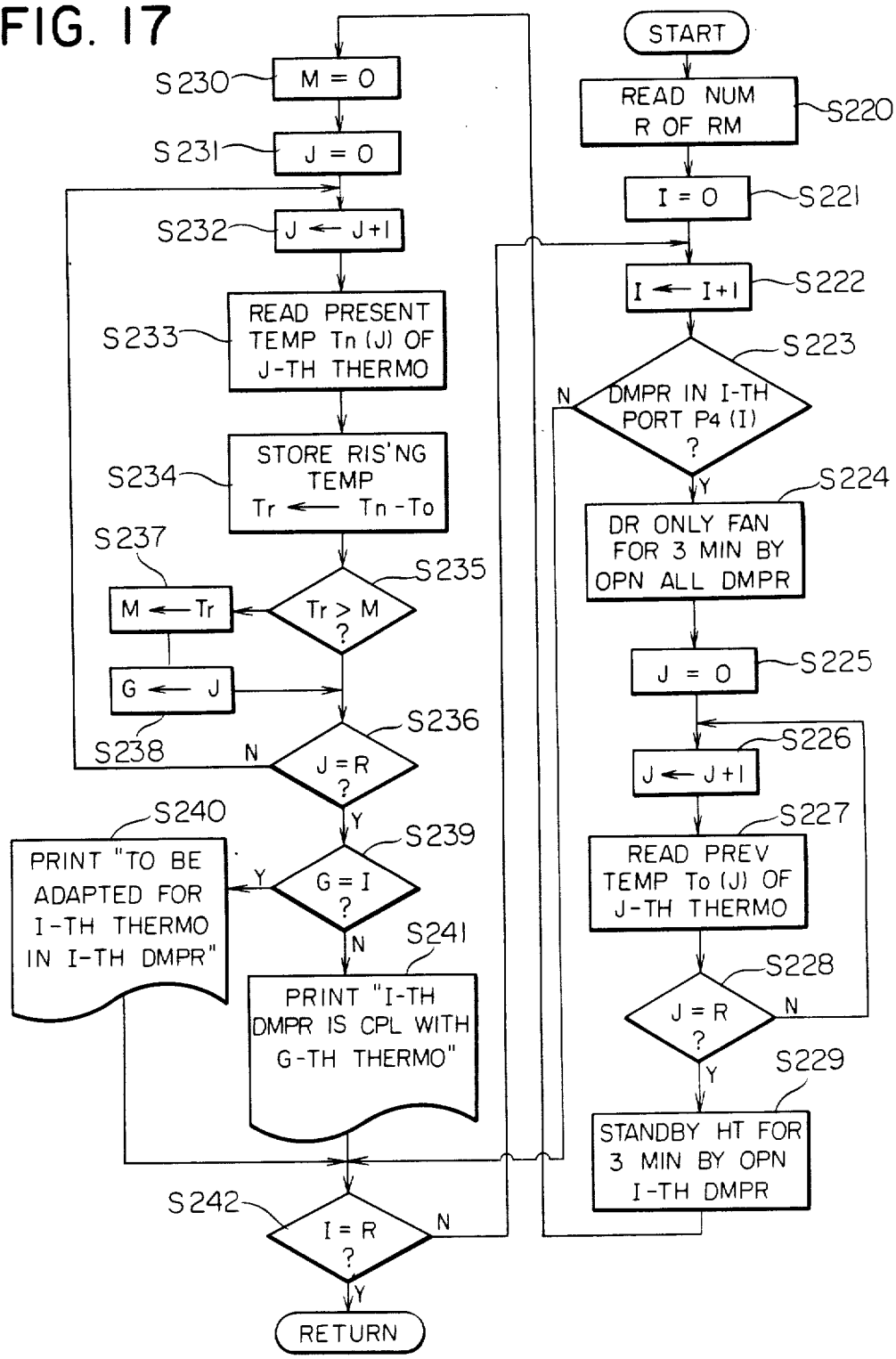
Figure 18:
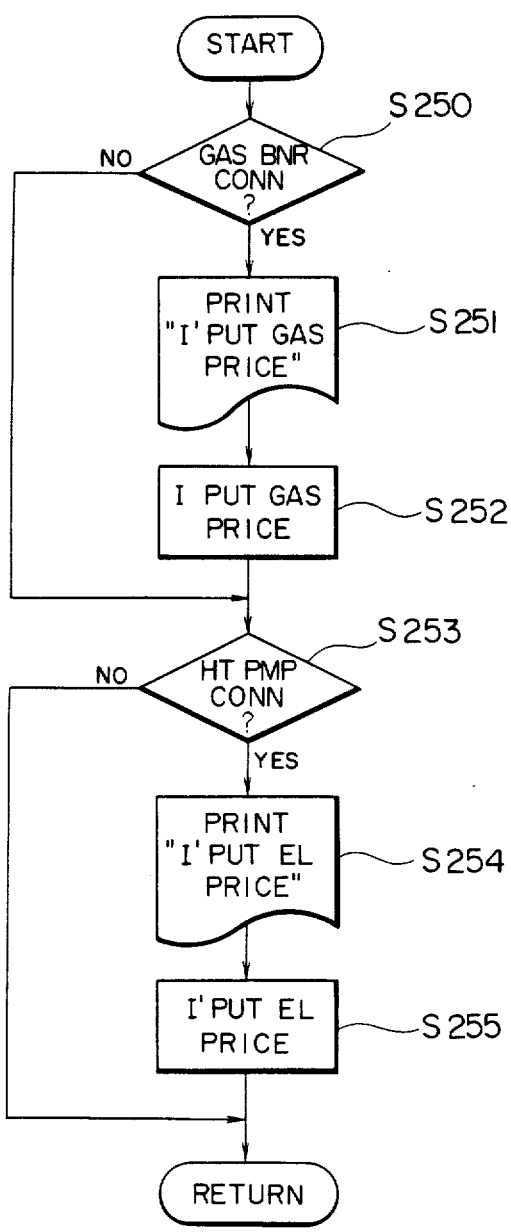

Then, the initializing operation will be described with reference to the flow charts of the initializing program shown in FIGS. 15 to 18. FIG. 15 shows the check of the presence or absence of the damper (62) and the thermostat (55), FIG. 16 shows the check of the presence or absence of the gas burner (30) and the heat pump (4) as air conditioning device, FIG. 17 shows the check of the adaptability of the damper (62) and the thermostat (55), and FIG. 18 shows the case that the gas and electric unit prices are input. The initializing items are contained in the memory of the analyzer (80), the operator can execute the desired items through the keyboard, and sequentially execute in accordance with the main program (not shown) contained in the analyzer (80). The input and the process of the variables in the program are all executed in the microprocessor and the RAM in the air conditioning controller. The program executing, the content of the operation and initializing information are displayed on the display unit of the analyzer (80) or printed in a printer to be notified to the operator, and the initializing information is input to the main controller (1).

The operation will be first described with reference to FIG. 15. In step (S201), the number (R) of the rooms is read out from the memory of the main controller (1) in the microprocessor. In step (S202), the loop variable (I) is initialized to zero, in step (S203), the variable (I) from 1 is counted up. In step (S204), the logic state of the output port ($P_4(I)$) for the I-th damper is read out to check whether the damper (62) is connected to the control line ($L_4(I)$) or not, i.e., whether the damper (62) exists in the port or not. If it is judged that the damper (62) is presented, the microprocessor advances to step (S205), reads out the input port ($P_5(I)$) for the thermostat corresponding to the output port ($P_4(I)$) for the damper to check whether the thermostat (55) is connected to the port or not. If it is judged that the thermostat (55) is not presented, the printer of the analyzer (80) prints "No thermostat for I-th damper" in step (S206).

On the other hand, if it is judged that the thermostat (55) is presented in step (S205), the microprocessor sets the flag (F) of the I-th damper (62) to "1" in step (S207). On the other hand, if it is judged that no damper (62) is presented in the I-th port ($P_4(I)$) in step (S204), the microprocessor sets the flag (F) of the I-th damper to "0" in step (S208). Therefore, the flag (F) is set to "1" only when the damper (62) and the thermostat (55) are presented.

The operation is advanced through the steps (S206) to (S208) described above to step (S209), and returned to the step (S203) until the loop variable (I) arrives at the number (R) of the rooms, and the abovementioned operation is repeated.

In the flow chart of FIG. 15, whether the ports ($P_4$) and ($P_5$), i.e., the damper (62) and the thermostat (55) are presented in each room is merely checked, but whether the thermostat is suitably disposed in the room corresponding to the damper is not checked.

The operation with respect to FIG. 16 will be described. The logic state of the output port ($P_2$) for the gas burner is read out in step (S210) to check whether the gas burner (30) is presented in the port with the control line ($L_2$) in a closed loop form, or whether the gas burner is not presented to form control line in an open loop. If it is judged that the gas burner (30) is presented, the flag (F) of the gas burner is set to "1" in step (S211), while if no gas burner is presented, the flag (F) is set to "0" in step (S212).

Then, the operation is advanced to step (S213) to read out the logic state of the port ($P_3$) for the heat pump output to check whether the heat pump (4) is connected with the port, i.e., whether the heat pump is presented or not. Similarly to the case of the step (S210), the flag (F) of the heat pump is set to "1" in step (S214) in case of "presence", and the flag (F) is set to "0" in case of "absence". Therefore, the main controller (1) grasps the constituted state if the initializing program of FIG. 16 is executed even if the construction of the air conditioner is varied to suitably alter the drive control.

Then, the operation will be described with reference to FIG. 17. Here, the operation is different from the FIG. 15 check which checks only for the presence or absence of the damper (62) and the thermostat (55). The logic flow of FIG. 17 checks whether they are disposed to be adapted for the same room (70) in FIG. 14, i.e., whether they are correctly connected to the corresponding ports ($P_4$) and ($P_5$).

In step (S220), the number (R) of rooms is read in as described above, and the loop variable (I) is reset in step (S221). In step (S222), the loop variable (I) is counted up from 1. In step (S223), it is checked whether the damper (62) is connected to the port ($P_4(I)$) for the I-th damper output. The operation is stepped to step (S242) in case of "absence", and returned to step (S222) when the loop variable (I) does not arrive at the number (R) of the rooms and checks the port ($P_4$) of the next damper output.

In step (S223), if it is judged that the damper (62) is presented in the I-th port ($P_4(I)$), the operation is advanced to step (S224), the dampers (62) of the all rooms are opened to control to drive the blower fan (40) for 3 minutes. In the step (S224), only the blower fan (40) is driven, for the purpose of maintaining the all room temperature solely constant before the following steps are executed.

Then, in step (S225), the loop variable (J) relative to the thermostat (55) is used, reset, and the variable (J) is sequentially counted up from "1" in step (S226) In step (S227), the temperature of the thermostat (55) connected with the J-th thermostat input port ($P_5(J)$) is read in as the previous temperature ($T_0(J)$), and recorded in the memory (not shown) in the main controller (1). In step (S228), when it is confirmed that the loop variable (J) arrives at the number (R) of the rooms, the operation is advanced to step (S229), while the (J) does not arrive at the number (R), the operation is returned to step (S226), and the previous temperature of the next thermostat is read out.

Thus, when the previous temperature ($T_0$) of the thermostat (55) connected with the port ($P_5$) is read out, only the damper (62) connected with the output port ($P_4(I)$) for the I-th damper is opened in step (S229), and the air conditioner is warmed up for 3 minutes together with the blower fan (40). In other words, the temperature of only the room disposed with the I-th damper (62) (the main controller (1) is identified as the I-th room) is raised.

In step (S230), the desired maximum value (M) relative to the rising temperature is reset to zero, and in step (S231) the loop variable (J) is reset. In step (S232), the loop variable (J) is counted up from "1", and in step (S233) the temperature of the thermostat (i.e., the J-th thermostat) connected with the J-th port ($P_5(J)$) is read in as the present temperature ($T_n(J)$), and stored in the memory (not shown).

In step (S234), the temperature ($T_n$) and $T_0$) obtained in the steps (S233) and (S217) are read out from the memory, and the difference therebetween is stored as the rising temperature ($T_r$). In step (S235), if the rising temperature ($T_r$) is not larger than the maximum value (M), i.e., when a sufficient temperature rise does not occur, the operation is advanced to step (S236), returned to the step (S232) until the variable (J) arrives at the number (R) of the rooms, and the abovementioned operation is repeated.

In step (S235), if the rising temperature (Tr) is recognized to be larger than the maximum value (M), the temperature (Tr) is stored as new maximum value (M). In step (S238), the value of the variable (J) is written in the number variable (G) corresponding to the maximum temperature rising thermostat, and the operation is advanced to step (S236). In step (S235), since the maximum value (M) is initially zero, the rising temperature (Tr) is rewritten if the temperature rise occurs, but the thermostat (55) which generates the largest rising temperature (Tr) can be detected by sequentially comparing with the rising temperature (Tr) of the thermostat (55).

Thus, the rising temperatures of the all thermostats (55) are checked. In step (S236), when the variable (J) arrives at the number (R) of the room, the operation is advanced to step (S239) to compare the value of the number variable (G) obtained in the step (S238) with the value of the variable (I). In other words, it is checked whether the port ($P_4(I)$) connected with the damper (62) of the room heated in step (S229) coincides with the port ($P_5(J)$) connected with the thermostat (55) exhibiting the maximum rising temperature written in step (S238) or not.

If they coincide, the I-th damper (62) and the I-th thermostat (55) are adapted and disposed in the same room (70) (i.e., since the damper and the thermostat of the same room are simultaneously operated, the simultaneous operation is displayed in step (S240). In this embodiment, it is printed on a printed provided in the analyzer (80). If the number variable (G) and the variable (I) do not coincide, the I-th damper is printed to be "coupled with the G-th thermostat" in step (S241). In other words, when the control line ($L_4$) and the control lines ($L_5$), ($L_6$) (the control lines ($L_6$) may be integral with ($L_5$)) are wired, any error occurs in any control line can be detected. In this case, the operator of the analyzer (80), i.e., the serviceman can immediately correct to rewire to be adapted for the control lines ($L_5$) and ($L_6$).

In step (S242), until the variable (J) arrives at the number (R) of the rooms, the all operations above the return to the step (S222) are repeated to finish and confirm whether the all thermostats are adaptively disposed at the dampers of the all rooms or not. Finally, the inadequate wiring is corrected by the serviceman to store the initializing information that the damper (62) and the thermostat (55) are in the adapted state in all the rooms is stored in the main controller (1).

The operation will be described with reference to FIG. 18. In step (S250), when it is confirmed that the gas burner (30) is connected with the port ($P_2$), step (S251) prints the display unit of the analyzer (80), i.e., to print "to input gas price" to the printer. The serviceman inputs the gas price, i.e., the unit price per unit volume through the keyboard of the analyzer (80) in step (S252).

Then, in step (S253), if it is confirmed that the heat pump is connected with the port ($P_3$), step (S254) prints to "input electric price". The serviceman inputs the electric price, i.e., the unit price per unit power consumption in step (S255). Thus, the initialization of energy cost information is finished.

As described above, the initializing information of the following paragraphs (a) to (d) are applied through the analyzer (80) to the main controller (1) as described with respect to FIGS. 15 to 18.

(a) Whether the damper (62) and the thermostat (55) are presented in each room or not (FIG. 15).

(b) Whether the heat pump and the gas burner are presented or not as the air conditioner (FIG. 16).

(c) Whether the damper (62) and the thermostat (55) in each room are adapted or not (FIG. 17).

(d) The unit prices of the gas fee and electric fee (FIG. 18).

When the initializations (a) to (d) are set, even if the number of the rooms, the presence or absence of the air conditioner in the rooms, the type of the air conditioner, and the gas and electric fees are altered, the main controller (1) may not alter in construction and in program, but the alteration can be remedied merely by the variation in the wirings of the control lines ($L_2$ to $L_6$). In general, the air conditioning by the heat pump is ordinarily highly efficient and low cost, though depending upon the performance of the air conditioner, but when the atmospheric temperature extremely decreases, it is matters of common knowledge that the heating of gas burner becomes higher efficient. Therefore, when the boundary data is input to the main controller (1), the main controller can be automatically switched in the operation of the air conditioner to one of low energy cost merely by initializing the gas and electric fees through the analyzer (80) as shown in FIG. 18.

In the embodiments described above, the printer is used as the display unit of the analyzer (80). However, the message may be displayed merely on the liquid crystal display unit.

In the embodiment shown in FIG. 17, it is driven for 3 minutes by considering the temperature stability and the delay time of the temperature rise in the respective rooms in steps (S224) and (S229), but this time is not always limited to the particular embodiment.

After the initialization is finished, the analyzer (80) is removed from the service port (Ps) together with the control line (Ls). The analyzer (80) may be carried by the serviceman, and when the object of the main controller (1) is altered or any inconvenience occurs, it may be suitably connected to the service port (Ps) of the main controller (1) to again initialize at every time.

When the analyzer of the main controller according to the above embodiments is used, the check of the air conditioner and the check of the connected state of the control lines of the damper corresponding to the rooms can be performed without approaching at every time but with the analyzer provided at hand, and the initialization can be very simply and conveniently carried out.

The present invention can be applied for cooling and heating apparatus not only for a residence but for a building or an office having a plurality of rooms.

What is claimed is:

1. A duct type multizone air conditioning system having a cooling and heating heat pump, a heating gas burner, a supply air duct for supplying air to a plurality of zones to be air conditioned, and a blower fan for forcibly circulating conditioned air through the duct to the plurality of zones to be air conditioned comprising:

a plurality of temperature detecting means, respectively disposed in corresponding ones of the zones to be air conditioned, each temperature detecting means detecting a present temperature of the corresponding one of the zones;

a plurality of air damper means, respectively disposed in corresponding ones of the zones, for controlling the supply air to the corresponding zones to be air conditioned;

a plurality of zone temperature setting means, respectively disposed in corresponding ones of the zones, each temperature setting means setting a present set temperature for the corresponding one of the zones;

means for controlling the opening and closing of the air damper means so that the present temperatures detected by each of said temperature detecting means become said present set temperatures set by said zone temperature setting means;

means for automatically determining the number of the zones to be air conditioned;

mean sfor automatically determining the presence of an air damper means and corresponding temperature detecting means in each zone;

means for automatically determining the presence of a heating gas burner and the presence of a heat pump within the air conditioning system;

means for automatically determining the presence of a damper means and corresponding temperature setting means in the same zone; and means for receiving heat pump cost and heating gas burner cost information so as to ensure cost-effective use of the heat pump and heating gas burner.

2. A duct type multizone air conditioning system according to claim 1 wherein said means for controlling the opening and closing of the air damper means comprises:

main temperature setting means for simultaneously setting a present set temperature for a set of said plurality of zones;

memory means receiving the present set temperatures from said main temperature setting means and from said plurality of zone temperature setting means, for providing signals corresponding to the present set temperature set by said main temperature setting means and signals corresponding to the present set temperature set by said plurality of zone temperature setting means, and for storing the present set temperatures from said main temperature setting means and the present set temperatures from said plurality of zone temperature setting means; and temperature determining means for comparing the stored present set temperatures with the received present set temperatures and when incoincidence occurs, altering a stored present set temperature in accordance with the incoincidence.

3. A duct type multizone air conditioning system according to claim 2 wherein said main temperature setting means and said zone temperature setting means each respectively comprise display means for displaying the corresponding present set temperature and the present temperature.

4. A duct type multizone air conditioning system according to Claim 1 wherein said means for controlling the opening and closing of the air damper means comprises:

timer means for providing time signals corresponding to sequential times;

reset means for manually entering a present set temperature and for setting an associated predetermined time corresponding to a time signal received from said timer means;

means for storing said manually entered present set temperature and said associated predetermined time; and display means for displaying said predetermined time and said manually entered present set temperature.

5. A duct type multizone air conditioning system according to Claim 4 wherein said means for controlling the opening and closing of the air damper means further comprises:

check means for checking the manually entered present set temperature and the associated predetermined time.

6. A duct type multizone air conditioning system according to claim 1 further comprising:

analyzer means, operatively connectable to said means for controlling the opening and closing of the air damper means, for providing initializing information to the opening and closing means necessary for air conditioning control, including said heat pump cost and heating gas burner cost information.

* * * * *

UNITED STATES PATENT AND TRADEMARK OFFICE
CERTIFICATE OF CORRECTION

PATENT NO. : 4,716,957
DATED : January 5, 1988
INVENTOR(S) : Peter Thompson et al It is certified that error appears in the above-identified patent and that said Letters Patent is hereby corrected as shown below:

On the title page inventors should read

--(75) Inventors: Peter Thompson; Nobuo Otsuka, both of Kamakura, Japan --.

Signed and Sealed this

Seventh Day of June, 1988

Attest:

DONALD J. QUIGG

Attesting Officer

Commissioner of Patents and Trademarks